United States Patent [19]

Basso

[11] Patent Number: 4,841,164

[45] Date of Patent: Jun. 20, 1989

[54] LIGHT-SENSITIVE SWITCH STRUCTURE AND METHOD WITH INVERSE OFF/ON RATIO

[76] Inventor: Egidio Basso, 9145 Dallas, Grosse Ile, Mich. 48138

[21] Appl. No.: 219,743

[22] Filed: Jul. 18, 1988

Related U.S. Application Data

[63] Continuation-in-part of Ser. No. 828,370, Feb. 11, 1986, Pat. No. 4,771,186.

[51] Int. Cl.$^4$ .................... H01H 35/00; H01H 47/24
[52] U.S. Cl. ................................ 307/117; 250/206; 250/214 AL; 361/175
[58] Field of Search ............................ 307/116–117; 250/206, 209, 214 AL; 361/174–177

[56] References Cited

U.S. PATENT DOCUMENTS

| | | | |
|---|---|---|---|
| 3,351,762 | 11/1967 | Adkins et al. | 250/206 |
| 3,529,214 | 9/1970 | Corn | 307/117 |
| 3,629,649 | 12/1971 | Del Zotto | 361/175 |
| 3,636,357 | 1/1972 | Del Zotto | 361/175 |
| 3,916,183 | 10/1975 | Duve et al. | 250/114 |
| 4,095,100 | 6/1978 | Selick | 250/206 |

Primary Examiner—Vit W. Miska
Attorney, Agent, or Firm—Dale R. Small & Associates

[57] ABSTRACT

Light-sensitive switch structure for and method of turning a street light or other load on or off in response to variations in light level. The switch is designed to recognize a specific sequence of daily variations in light level and is capable of switching a load off at a light level lower than that at which the load is switched on. In a preferred embodiment, the switch consists of a photo-sensitive element, two operational amplifiers, a relay with its associated driver circuit, and a number of resistors forming voltage dividers. In accordance with the method of the invention, the photo-sensitive element, together with a resistor, establishes a signal voltage which varies in relation to the light level. Other resistors form voltage dividers which establish reference voltage levels at which desired switching is to occur. The operational amplifiers perform comparisons between the signal voltage and reference voltages and switch accordingly. One amplifier operates the relay which controls the load while the other biases the signal voltage to achieve the desired inverse operation. The stability of both amplifiers is insured by using feedback resistors to provide hysteresis, and a time delay circuit, consisting of a resistor and a capacitor to prevent sudden changes in the signal voltage. In other embodiments, two relays are used, one to control the load and the other to increase or decrease, by means of resistors, the currents through the operating coils of the relays to achieve the desired inverse off/on operation.

20 Claims, 4 Drawing Sheets

LIGHT-SENSITIVE SWITCH STRUCTURE AND METHOD WITH INVERSE OFF/ON RATIO

RELATED APPLICATIONS

This application is a continuation-in-part of application Ser. No. 828,370 filed February 11, 1986 U.S. Pat. No. 4,771,186.

BACKGROUND OF THE INVENTION

1. Field of the Invention

The present invention relates to condition-sensitive switching structures and methods and refers more specifically to a light-sensitive electrical switch and method useful for controlling street lamps or decorative and/or safety lighting so that they are energized during the hours of darkness.

2. Description of the Prior Art

The structures commonly used at the present time for controlling street lights include photo-sensitive elements. These structures are simple, inexpensive, and operate automatically and reliably for a number of years. They generally consist of a photo-sensitive element the resistance of which varies inversely as the light striking it, a time delay relay with normally closed contacts to control the load and, occasionally, some resistors to control the current through the operating coil of the relay. The time delay feature is needed to prevent the control from responding to transient changes in light level such as may be caused by lightning flashes or automobile headlights. The normally closed contacts provide "fail-on" operation of the street lights in response to the most likely failure modes of the control.

Adjustment of the turn-on light level in accordance with prior methods for controlling street lights is made by adjusting the drop-out current through the relay. This may be accomplished by controlling the light which strikes the photo-sensitive element, limiting the relay current with resistors, and/or mechanically adjusting the force required to operate the relay contacts. Once the turn-on light level has been selected, the turn-off light level is automatically fixed also. And, since the relay's pull-in current is always higher than the drop-out current, the turn-off light level will always be higher than the turn-on light level. This turn-off light level to turn-on light level ratio, typically, varies anywhere from 2:1 to 5:1.

For a number of reasons, it is desirable to turn on the street lights in the evening earlier than when they are actually needed. These reasons have to do with the physiological effects that the waning evening light has on the human eye and also with the fact that some street lights presently in use require a period of warm-up time before they reach full brilliance. However, this means that the lights are turned off in the morning at a light level which is from two to five times higher than the turn-on level in the evening. In fact, it is satisfactory to turn the lights off in the morning at a light level which may be three or four times less than the turn-on light level in the evening, depending on its value. Thus a light-sensitive switch with a turn-off to turn-on ratio of less than 1:1 would be desirable. Ratios of 1:3 or 1:4 would be ideal if relatively high turn-on values are required in the evening. Such a control would promptly turn off the lighting load when it was no longer needed, thereby saving substantial amounts of energy.

The prior art discloses efforts to address this problem by designing light-sensitive switches with off/on ratios as close to 1:1 as possible (see U.S. Pat. No. 3,351,762 and U.S. Pat. No. 4,095,100 for a description of some of these efforts). The difficulty with these controls is that their operation may become unstable. When the light level is near the operating point in the evening or in the morning, slight variations in light intensities, such as may be caused by clouds, may cause the control to cycle on and off. This mode of operation is disturbing to the viewer and may also cause damage to some of the lights presently in use.

SUMMARY OF THE INVENTION

The present invention is a light-sensitive switch for and method of turning a load, such as a street lamp, on or off in response to a varying condition such as light light level. The structure and method of the invention provide for automatically turning the load off in the morning at a light level which is lower than the light level at which the load was turned on in the evening, thus providing an inverse turnoff to turn-on ratio. Such operation is accomplished in accordance with the method of the invention by using an auxiliary relay to increase, during the hours of darkness, the current through the relay which controls the load. The stability of the control is assured by providing the biasing current upon reaching a light level which is lower than the turn-off light level in the morning. Furthermore, the amount of biasing current supplied will cause the total current through the load control relay to be close, but not equal, to the load control relay pull-in value. The load control relay pull-in value will only be reached when the current is increased in response to the increasing light level in the morning. Such operation may also be accomplished in accordance with the method of the invention by using electronic components, such as operational amplifiers, to compare the voltage level established by the photo-resistor element in conjunction with a another resistor and reference voltage levels established by settable voltage dividers and performing the desired switching based on these comparisons.

DETAILED DESCRIPTION

Figure 1:
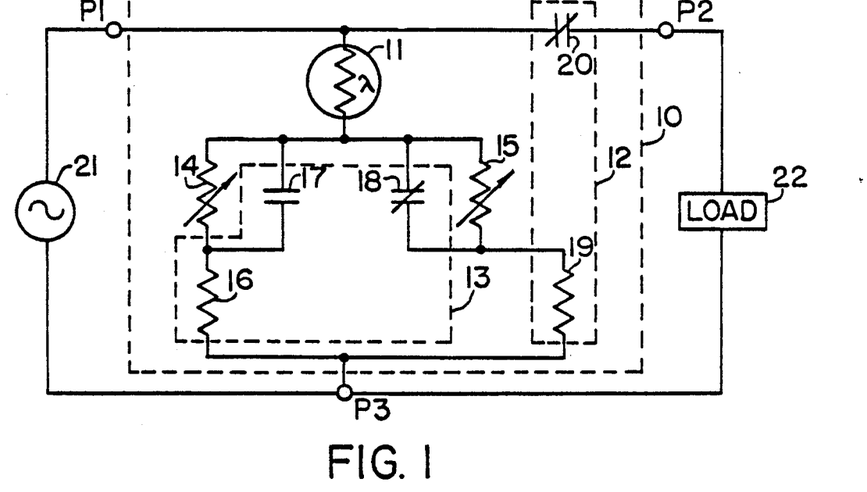
FIG. 1 is a schematic diagram of light-sensitive switch structure constructed in accordance with the invention for practicing the method of the invention shown connected to a source of alternating current electrical energy and to a load.
Figure 2:
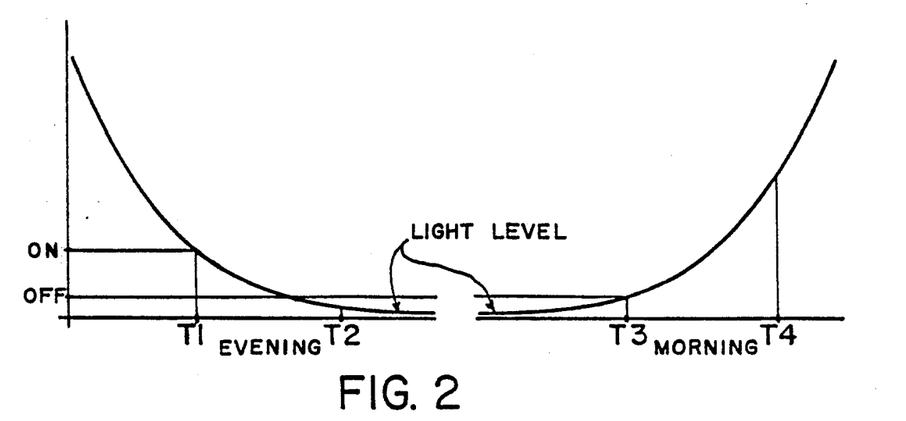
FIGS. 2 through 8 are graphs useful in explaining the operation of the circuit of FIG. 1 in accordance with the method of the invention showing, as a function of time, the evening and morning variations in light level, the corresponding variations in the resistance of the photo-sensitive element of the circuit shown in FIG. 1, the current through the operating coil of the load control relay shown in FIG. 1 and the status (open or closed) of its normally closed contacts, the current through the operating coil of the auxiliary relay shown in FIG. 1 and the status of the normally open and normally closed contacts of the auxiliary relay, respectively.

The embodiment shown in FIG. 1 is useful in explaining in detail the method of operation of the present invention. This embodiment consists of a light-sensitive switch 10 including a photo-sensitive element or photo-resistor 11, whose resistance varies in inverse proportion to the light striking it, a load control relay 12, an auxiliary relay 13, and two current limiting resistors 14 and 15.

In this embodiment the load control relay 12 and the auxiliary relay 13 are are both time delay thermostatic switches each having a bimetallic actuating arm in thermal contact with their respective heating coils 19 and 16. The load control relay 12 also has a set of normally closed contacts 20, while the auxiliary relay 13 has a set of normally open contacts 17 and a set of normally closed contacts 18.

The components of the switch 10 are intended to be assembled and mounted in a plug unit which is known in the prior art and is not illustrated here (see U.S. Pat. No. 3,048,833). This unit is equipped with three contacts or prongs protruding through the base and designed to mate with a corresponding socket on the street light control fixture in accordance with the requirements of American National Standard ANSI C136.10-1979 (it can also be assembled in different configurations to satisfy other applications). These prongs are identified as P1, P2, and P3 in the schematic diagram of FIG. 1 and are used for connecting the switch 10 to the alternating current (AC) electrical energy source 21 and to the load 22. Spark gaps and other components may also be added to provide protection against lightning and other line surges.

As illustrated in FIG. 1, the photo-sensitive element 11 is connected on one side to the prong, or terminal, P1 which, when the switch 10 is plugged into its mating socket, will connect the photo-sensitive element 11 to the line side of the AC energy source 21. On the other side the photo-sensitive element 11 is connected to one side of two parallel branch circuits.

The first of the parallel branch circuits consists of current limiting resistor 14 connected in series with the heating coil 16 of the auxiliary relay 13. The second of the parallel branch circuits consists of another current limiting resistor 15 connected in series with the heating coil 19 of the load control relay 12.

The other side of each of the two parallel branch circuits is, in turn, connected to prong P3. Thus, when the switch 10 is plugged into its mating socket, the connection of the photo-sensitive element 11 and parallel branch circuits to the AC energy source 21 is completed.

The normally open contacts 17 of the auxiliary relay 13 are connected in parallel with current limiting resistor 14. Thus the resistor 14 will be short-circuited when the auxiliary relay 13 is energized.

The normally closed contacts 18 of the auxiliary relay 13 are connected in parallel with current limiting resistor 15. Therefore, resistor 15 will be short-circuited when the auxiliary relay 13 is de-energized.

The normally closed contacts 20 of the load control relay 12 are connected between prongs P1 and P2 of the switch 10. When the switch 10 is plugged into the mating socket, the prongs will connect the load 22 to the AC energy source 21 provided the contacts 20 are closed which, in turn, will occur when the load control relay 12 is de-energized.

The graphs of FIGS. 2 through 8 in conjunction with the schematic diagram of FIG. 1, will be used to describe the daily sequence of operation of the light-sensitive switch 10 in accordance with the method of the invention.

During the daylight hours, when the light level is high, the resistance of the photo-sensitive element 11 is at its minimum. Therefore, the currents through the operating coils 16 and 19 of the auxiliary relay 13 and the load control relay 12, respectively, are higher than the pull-in values and relays 13 and 12 are energized. At this time current limiting resistor 14 is short-circuited while current limiting resistor 15 is in the circuit in series with heating coil 19 of the load control relay 12. Also, normally closed contacts 20 are in the open position and the load 22 is de-energized.

Figure 3:
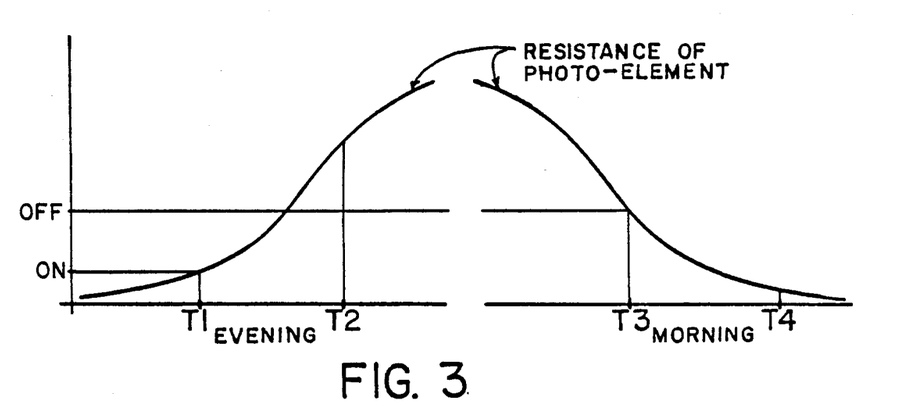
Figure 4:
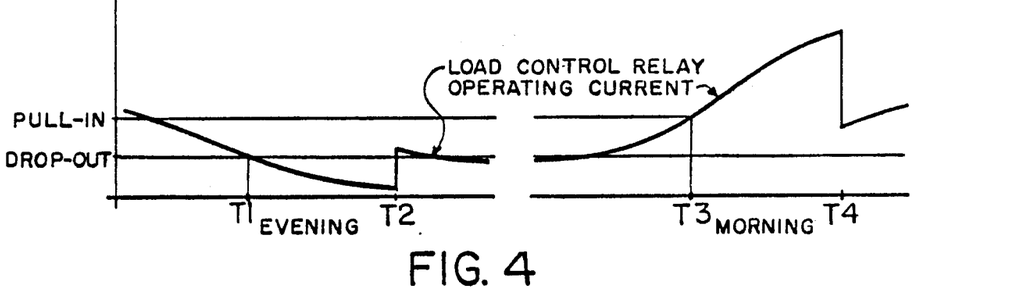
Figure 5:
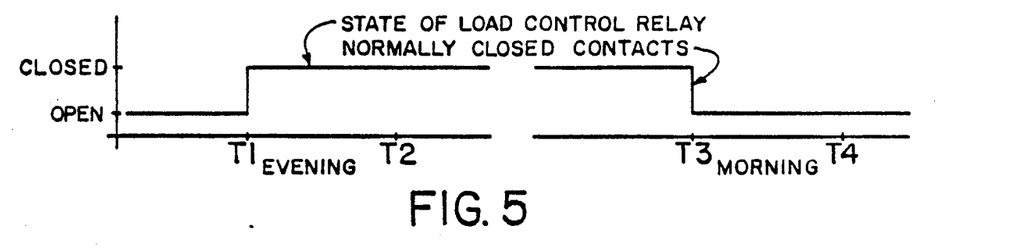
Figure 7:
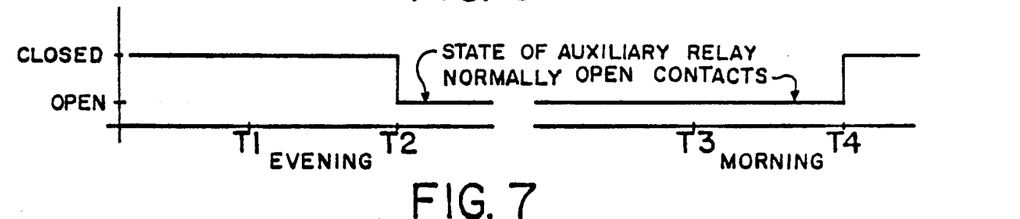
Figure 8:
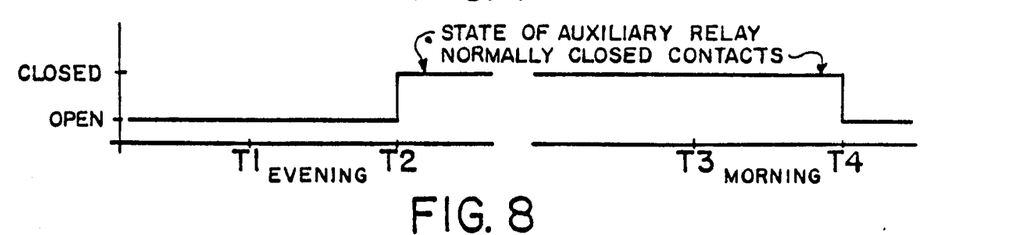

As the light drops to a predetermined level in the evening, the increase in the resistance of the photo-sensitive element 11 will cause the load control relay 12 to drop out as shown in FIG. 4, contacts 20 to close as shown in FIG. 5, and the load 22 to be energized. These events are indicated at time T1 in FIGS. 3, 4, and 5. Auxiliary relay 13 has not yet dropped out as shown in FIGS. 7 and 8 because its operating current is still above the drop-out level, as shown in FIG. 6, owing to the fact that its current limiting resistor 14 is short-circuited.

Figure 6:
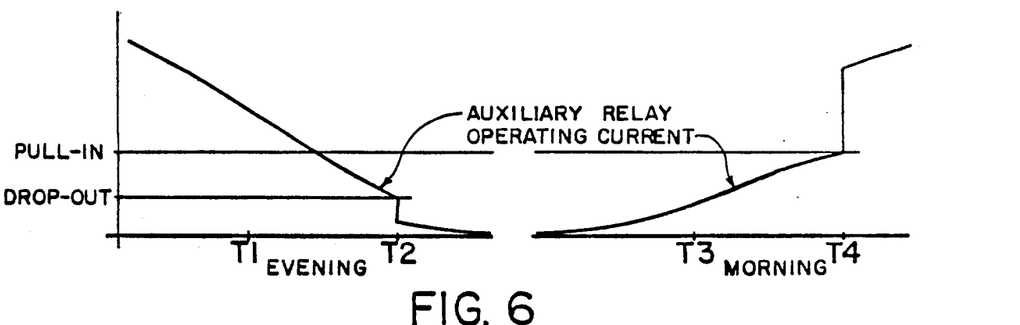

As the light level declines further in the evening, the resistance of the photo-sensitive element 11 will continue to increase as shown in FIG. 3, and the operating currents through the relays 12 and 13 will continue to decrease as shown in FIGS. 4 and 6, respectively. Eventually the drop-out current will be reached for auxiliary relay 13 also. This event is indicated at time T2 in FIGS. 2, 3, 4, 6, 7, and 8.

When auxiliary relay 13 drops out, contacts 17 will open and contacts 18 will close. This will insert current limiting resistor 14 in series with the operating coil 16 of the auxiliary relay 13, thus further reducing its operating current as shown in FIG. 6. It will also short-circuit current limiting resistor 15 which is in series with the operating coil 19 of the load control relay 12, thus increasing its operating current as shown in FIG. 4.

The values of the components in circuit 10 must be chosen so that the operating current of the load control relay 12 is biased towards, but is not permitted to reach, the pull-in value of the load control relay 12 at this time T2 as shown in FIG. 4. This will permit the load control relay 12 to remain de-energized thus keeping the load 22 energized through the hours of darkness.

As the light level begins to increase in the morning, the resistance of the photo-sensitive element 11 will decrease, and the operating currents through both relays 12 and 13 will increase as shown in FIGS. 4 and 6, respectively. The load control relay 12, whose operating current is not being limited by current limiting resistor 15 at this time, will reach the pull-in value first, causing it to open contacts 20 and deenergize the load 22. This event is indicated at time T3 in FIGS. 2, 3, 4, and 5.

Although the pull-in current for both the auxiliary relay 13 and the load control relay 12 is two to five times higher than their respective drop-out currents, the biasing effect on the load control relay 12 brought about by auxiliary relay 13, and described above, will permit the load 22 to be switched off at a light level lower than that at which the load 22 was switched on the evening before.

As the light level increases further, the operating current through the auxiliary relay 13 will reach the pull-in value. This event is indicated at time T4 in FIGS. 2, 3, 6, 7, and 8. Current limiting resistor 14 will be short-circuited by the closing of contacts 17, causing the operating current through auxiliary relay 13 to increase as shown in FIG. 6. Current limiting resistor 15 will be re-inserted in series with the operating coil 19 of load control relay 12 by the opening of contacts 18 as shown in FIG. 8. This will cause the operating current through load control relay 12 to decrease as shown in FIG. 4. However, the component values in circuit 10 are such that this current will not reach the drop-out value of load control relay 12 as shown in FIG. 4 so as not to re-energize the load 22.

The components have now completed their daily cycle of operation in accordance with the method of the invention and are now set to repeat it again the following evening.

As indicated above it is recognized that for proper operation of the switch 10, it is necessary to coordinate the selection of the various component values and operating characteristics with each other. These values however are either readily available commercially or can be incorporated into the design and manufacture of the components easily within the skill of the art. Furthermore, some of the operating characteristics or component values, such as the values of the current limiting resistors 14 and 15, may be made variable, as shown in FIG. 1, so the user of the device can select the operating characteristics of the switch 10 to meet specific requirements.

While one embodiment of the structure and method of the invention has been considered in detail above, it will be understood that other embodiments and modifications of the invention are contemplated.

Figure 9:
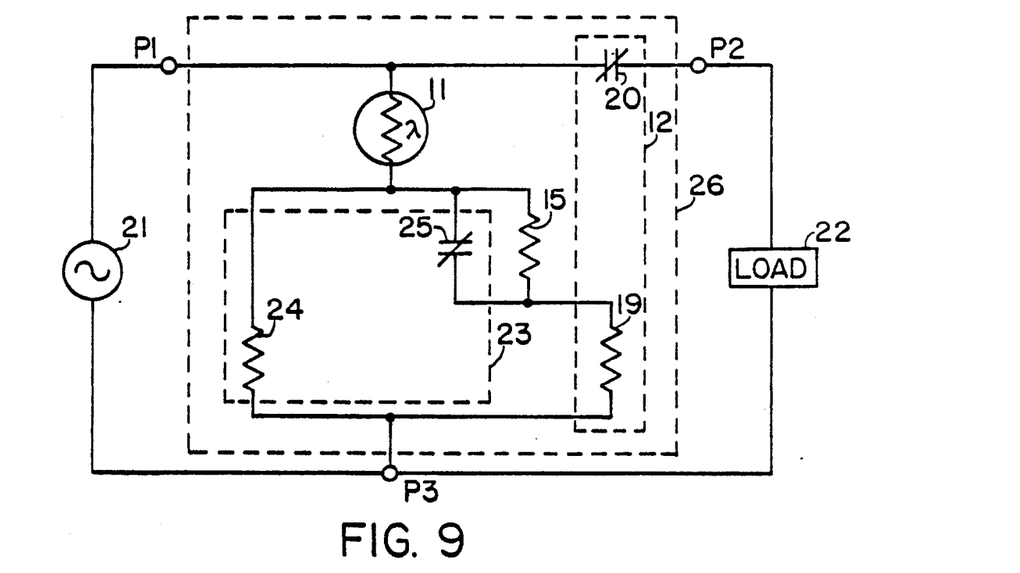
FIG. 9 is a schematic diagram of a second embodiment of the invention.

FIG. 9 depicts, schematically, a light-sensitive switch 26 intended to simplify the circuit of FIG. 1 and some of the components described therein. In this embodiment, the auxiliary relay 23 has been simplified to have only a set of normally closed contacts 25 in addition to its operating coil 24. The current limiting resistor 14 and normally open contacts 17 of FIG. 1 have been eliminated. This is made possible by designing the auxiliary relay 23 with operating characteristics that will cause it to drop out at T2 and pull in at T4, as shown in FIG. 6, without biasing its own operating current.

Figure 10:
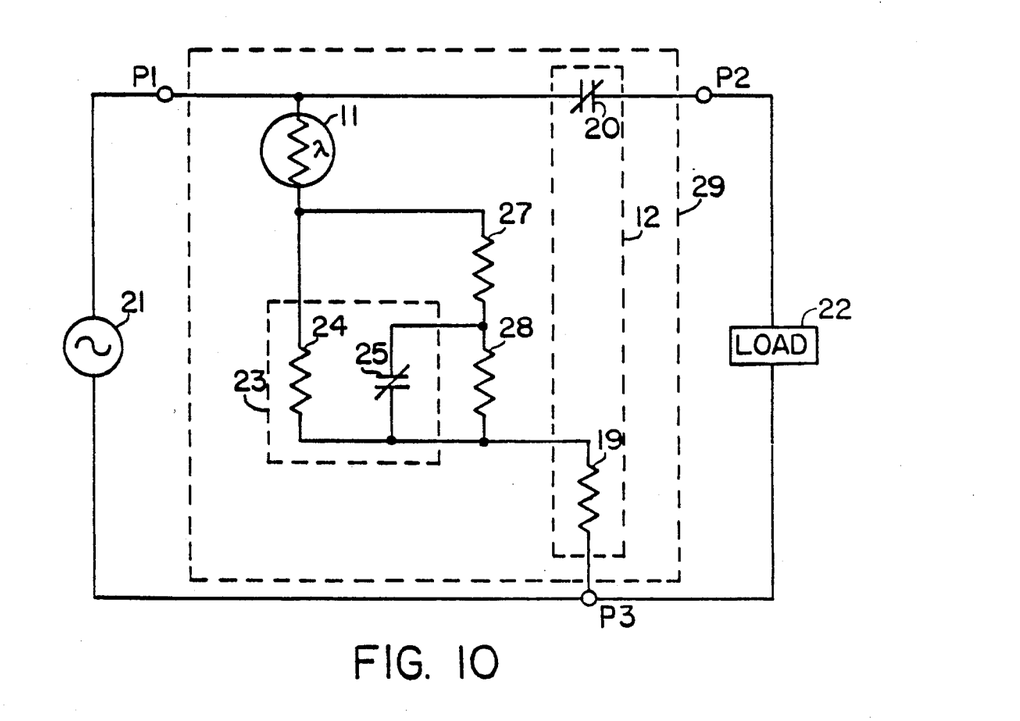
FIG. 10 is a schematic diagram of a third embodiment of the invention.

FIG. 10 depicts schematically another light-sensitive switch 29 which utilizes the simplified auxiliary relay 23 described above but without the stringent requirements placed on the design of its operating characteristics. This is accomplished by using current limiting resistors 27 and 28 in conjunction with the normally closed contacts 25 of auxiliary relay 23 to bias both its own operating current and the operating current of the load control relay 12.

The switch 29 of FIG. 10 consists of the series connection, between P1 and P3, of the photo-sensitive element 11, the operating coil 24 of the auxiliary relay 23, and the operating coil 19 of the load control relay 12. The operating coil 24 of the auxiliary relay 23 is shunted by the current limiting resistors 27 and 28 connected in series with each other. Current limiting resistor 28 is, in turn, shunted by the normally closed contacts 25 of the auxiliary relay 23. The required biasing function occurs when the normally closed contacts 25 drop to the closed position at time T2, FIGS. 4 and 6. The closing of these contacts 25 causes the total resistance of the parallel combination of the current limiting resistors 27 and 28 and the operating coil 24 of the auxiliary relay 23 to be decreased. This will increase the current through the operating coil 19 of the load control relay 12. It will also reduce the resistance of the path shunting the operating coil 24 of the auxiliary relay 23, thus reducing its operating current. The process is reversed at time T4 so that the operation of this switch 29 is the same as that of switch 10 shown in FIG. 4.

Figure 11:
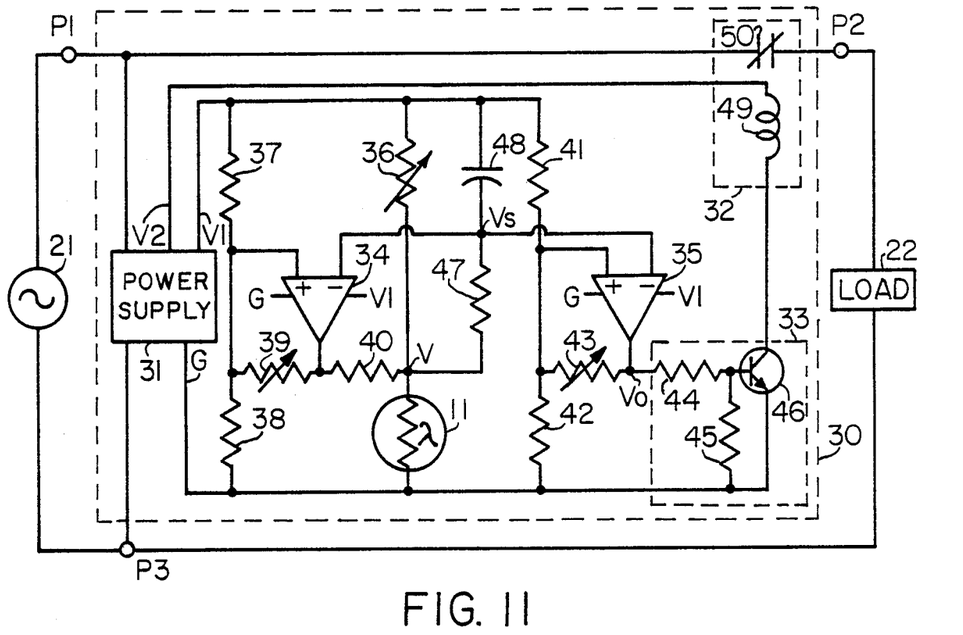
FIG. 11 is a schematic diagram of a fourth embodiment of the invention utilizing electronic components to switch the load and including a load control relay with normally closed contacts.

FIG. 11 depicts, schematically, the presently preferred embodiment of the invention. The switch 30 controls the load 22 by means of a relay 32 equipped with normally closed contacts 50. The operating coil 49 of the load control relay 32 is energized or de-energized, in accordance with the method of the invention, by the electronic circuitry depicted in the schematic and operating as described below.

The circuit consists essentially of voltage dividers to establish the signal voltage and the reference voltages at which the switching will occur and operational amplifiers connected as voltage comparators to perform the desired switching.

The power supply 31, represented only in symbolic form, is connected across the source of alternating current (AC) electric energy 21 whenever the switch 30 is installed in its mating socket by prongs P1, P2, and P3 on, for example, a street light. It provides a suitable direct current (DC) voltage between the terminal V1 and ground G necessary to energize the electronic circuitry of the switch 30. The actual connections to the corresponding terminals of the operational amplifiers 34 and 35 have not been shown in FIG. 11 but have been indicated by also labeling the terminals on operational amplifiers 34 and 35 as V1 and G.

The voltage at terminal V1 with respect to terminal G may be any voltage within the acceptable operating range of the operational amplifiers 34 and 35 and would typically be between 5 volts and 24 volts. The power requirements of the power supply 31 would be determined primarily by the requirements of the operating coil 49 of the load control relay 32. The power supply may be designed, as in FIG. 11, to have a second output with respect to G, in addition to the one indicated above. This output, identified as V2 in FIG. 11, is designed to energize only the operating coil 49 of the load control relay 32. This arrangement permits greater freedom in selecting the operating characteristics of the load control relay 32.

The switching signal or voltage at V in FIG. 11, is established by the voltage divider consisting of resistor 36 and the photo-resistive element 11. However, the switching voltage connected to the inputs of amplifiers 34 and 35 is taken from the node between capacitor 48 and resistor 47 at Vs in FIG. 11. Capacitor 48 and resistor 47 are intended to form a time delay circuit that will prevent the voltage Vs from reacting to sudden changes in the resistance of photo-resistive element 11 such as may be caused by lightning flashes or automobile headlights. Otherwise, as long as light level changes occur only gradually, the signal voltage Vs will be essentially the same as voltage V.

The value of voltage V, and thus Vs, is affected not only by the values of photo-resistance 11 and resistor 36 but also by the output of operational amplifier 34 through resistor 40. When the output is high (near V1) V will be raised, and when the output is low (near G) V will be lowered. The amount of change in V will depend on the resistance value of resistor 40 with respect to the values of photo-resistor 11 and resistor 36.

The signal voltage Vs is connected to the inverting input of each operational amplifier 34 and 35, having the symbols (−) in FIG. 11. The non-inverting input of each operational amplifier 34 and 35, designated (+) in FIG. 11, is connected to the midpoint of another voltage divider. Operational amplifier 34 has its divider constructed with resistors 37 and 38, and operational amplifier 35 has its divider constructed with resistors 41 and 42. In addition, operational amplifier 34 has resistor 39 connected between its output and its non-inverting input (+), and operational amplifier 35 has resistor 43 connected between its output and its non-inverting input. The purpose of these two feedback resistors 39 and 43 is to provide hysteresis in the operation of each amplifier 34 and 35 in order to prevent unstable operation of the control.

The output of operational amplifier 35 controls the operation of load control relay 32 by means of driver circuit 33. The driver circuit consists of a resistive divider constructed with resistors 44 and 45 and transistor 46. The purpose of this circuit is to reduce the loading placed on the output of operational amplifier 35 and on the low voltage output V1 of the power supply 31.

The functional interaction of the various components described above and illustrated in FIG. 11 is as follows.

During the daylight hours, when the light level is high, the resistance of photo-resistor 11 is low and the voltage V (and therefore Vs) is low. The outputs of operational amplifiers 34 and 35 are both high since Vs is lower than their respective reference voltages. Since the output voltage Vo of the operational amplifier 35 is high, transistor 46 is conducting thus energizing the operating coil 49 of load control relay 32. Therefore, normally closed contacts 50 are open and the load 22 is de-energized.

As the light wanes in the evening, the resistance of photo-resistor 11 increases thereby increasing the signal voltage Vs. When the signal voltage Vs equals the reference voltage established at the non-inverting input (+) of operational amplifier 35 by resistors 41 and 42 (with resistor 43 connected to Vo which is in the high state) the operational amplifier 35 will switch its output voltage Vo to the low state. This will shut off transistor 46 which will in turn de-energize the load control relay 32, cause its contacts 50 to close, and turn on the load 22.

This will also cause the reference voltage for operational amplifier 35 to be decreased because resistor 43, which has one side connected to the non-inverting input (+), will have the other side switch from a high voltage (nearly equal to V1) to a low voltage (nearly equal to G). This hysteresis effect is useful in preventing the operational amplifier 35 from switching back on in the event the signal voltage Vs decreases slightly in response to an increase in the light level, such as may occur with changes in the cloud cover. The reference voltage, and thus the operating level, of operational amplifier 35 can be accurately established, as can the desired amount of hysteresis, by properly selecting the values of resistors 41, 42, and 43 relative to each other.

As the light level declines further and near-darkness is reached, the resistance of photo-resistor 11 continues to increase as does the signal voltage Vs. Eventually, this voltage will equal the reference voltage at the non-inverting input (+) of operational amplifier 34 which will change its output from the high state to the low state. In a manner analogous to that described in the paragraph above, operational amplifier 34, by means of resistor 39 in conjunction with resistors 37 and 38, will lower its reference voltage thus providing hysteresis to insure its stable operation.

In addition, when the output of operational amplifier 34 switches to the low state, the voltage V, and hence the signal voltage Vs, will be lowered also because resistor 40, which has one side connected to the node marked V, will have the other side switched from the high state to the low state. The amount of change is determined by properly selecting the value of resistor 40 in relation to the value of resistor 36 and to the resistance versus light characteristics of photo-resistor 11.

The amount of change must not be so large as to cause operational amplifier 35 to switch on at that instant. Rather, Vs should be reduced enough so that when the light increases in the morning to the desired level (which is lower than the light level when operational amplifier 35 switched off the evening before) the decrease in the resistance of photoresistor 11 will cause Vs to decrease to the value of the reference voltage at the non-inverting input. The output of amplifier 35 will switch to the high state and energize load control relay 32 which will turn off the load 22. The hysteresis provided by feedback resistor 43 will again serve to insure the stability of amplifier 35 by increasing the voltage at its non-inverting input (+).

As the light level increases further in the morning, the signal voltage Vs will continue to decrease until it will equal the reference voltage at the non-inverting input (+) of operational amplifier 34 causing the amplifier to switch from the low state to the high state. This will cause the signal voltage Vs to increase. But the time of this reset operation and the values of the appropriate components must be chosen so that the amount of increase will not cause the output of operational amplifier 35 to switch to the low state again. This change of state will also increase the reference voltage of operational amplifier 34 thus insuring its stability.

The daily cycle of operation has now been completed for this control, and the various components are set to repeat it again. Thus the operation of this control is completely analogous to that of the control depicted in FIG. 1. The advantage of this embodiment is that the various operating levels, including the amounts of hystereses desired, can be selected with great accuracy and repeatability.

Figure 12:
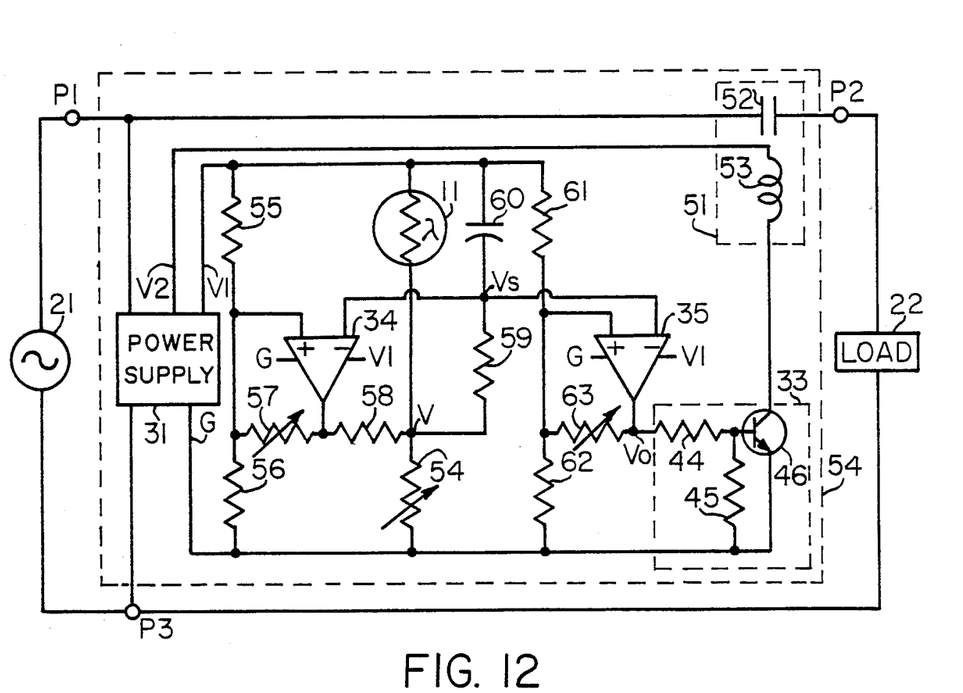
FIG. 12 is a schematic diagram of a fifth embodiment of the invention utilizing electronic components to switch the load and including a load control relay with normally open contacts.

FIG. 12 depicts, schematically, another embodiment utilizing electronic components. In this embodiment the switch 54 utilizes a load control relay 51 which controls the load 22 by means of normally open contacts 52. This is accomplished by energizing the operating coil 53 of the load control relay 51 during the hours of darkness.

The same result could have been accomplished using the circuit shown in FIG. 11 by modifying the relay driver circuit 33 to include an inverter that would allow it to drive the load control relay when the output of operational amplifier 35 is low and not drive the relay when said output is high. However, the circuit of FIG. 12 was chosen to show that the same result can be achieved by inverting the voltage divider circuit consisting of photo-resistor 11 and resistor 36 in FIG. 11 and as represented by photo-resistor 11 and resistor 54 in FIG. 12.

Resistor 54 in FIG. 12 has been given a different designation from resistor 36 in FIG. 11 to illustrate that a different value resistor must now be chosen to achieve the proper operation of the control 54 with the inverted circuit. The same applies to the other components where resistors 55, 56, and 57 correspond to resistors 37, 38, and 39, respectively. Resistors 58 and 59 and capacitor 60 correspond to resistors 40 and 47 and capacitor 48, respectively. An resistors 61, 62, and 63 correspond to resistors 41, 42, and 43, respectively.

The operation of the embodiment of the invention shown in FIG. 12 is completely analogous to the operation of the FIG. 11 embodiment and will therefore not be considered in detail.

Further embodiments and modifications of the invention are contemplated, including element 11 being responsive to other conditions such as heat, pressure, or sound.

Also, it will be understood that the values of the components of the circuits shown in FIGS. 11 and 12 may be variable to permit to permit varying the operating characteristics of the circuits. Thus for example, as shown, the resistors 36, 39, and 43 in the circuit of FIG. 11 and the resistors 54, 57, and 63 in the circuit of FIG. 12 may be variable. However, it is not contemplated that the components of the circuit be variable in preferred commercial embodiments of the invention to prevent undesired setting of the circuits operating conditions by inexperienced circuit users.

It is the intention to include all embodiments and modifications of the invention as are defined by the appended claims within the scope of the invention.

I claim:

1. Condition responsive primarily electronic switch means responsive to at least one of light, temperature, pressure and sound conditions for use in conjunction with a source of electrical energy and an electrical load for automatically connecting and disconnecting the electrical load from the source of electric energy, which primarily electronic switch means is responsive to a specific sequence of the condition levels to achieve an inverse off/on ratio whereby the electric load is disconnected from the source of electrical energy at a lower condition level to which said primarily electronic switch means is responsive than the condition level at which the electrical load is connected to the source of electrical energy.

2. Structure as set forth in claim 1 wherein the condition to which the switch is responsive varies in a predictable sequence.

3. Structure as set forth in claim 2 wherein the source of energy is a source of alternating electrical energy and the load is at least one light.

4. A source of electrical energy and an electrical load, means for connecting and disconnecting the electrical load to the source of electrical energy, and switch means responsive to light level for actuating the means for connecting and disconnecting the electrical load to the source of electrical energy responsive to a specific sequence of light levels to achieve an inverse off/on ratio whereby the electrical load is disconnected from the energy source in the morning at a lower light level than the light level at which the load is connected to the energy source in the evening.

5. Structure as set forth in claim 4 wherein the means for connecting and disconnecting the electrical load to the source of electrical energy comprises a load relay having contacts in series with both the source of electrical energy and the electrical load, and a coil operable on being energized to change the condition of the relay contacts.

6. Structure as set forth in claim 5 wherein the relay contacts are normally closed.

7. Structure as set forth in claim 5 wherein the relay contacts are normally open.

8. Structure as set forth in claim 4 and further including a power supply in parallel with the source of electrical energy which is in parallel the electrical load in series with the means for connecting the electrical load to the source of electrical energy and wherein the switch means comprises a first voltage divider having a first resistor and a photo-sensitive element in series which are in parallel with the power supply.

9. Structure as set forth in claim 8 wherein the switch means further indicates a first semiconductor responsive to the resistance of the photo-sensitive element to develop an electrical signal for actuating the means for connecting and disconnecting the load to the source of electrical energy at a predetermined light level in the morning.

10. Structure as set forth in claim 9 and further including a second semiconductor responsive to the resistance of the photo-sensitive element to lower the predetermined light level operable to cause the first semiconductor to cause connection of the electrical load to the source of electrical energy at a lower light level than that at which the load was connected to the source of electrical energy in the evening, but not so low as to cause the electrical load to be disconnected from the source of electrical energy prior to the light level actually rising whereby the load is disconnected from the source of electrical energy in the morning at a lower light level than the light level at which it was turned on the night before.

11. Structure as set forth in claim 10 and further including the means for providing feedback for the semiconductors to stabilize the operation thereof by providing hysteresis therein.

12. Structure as set forth in claim 9 and further comprising a time delay circuit including a capacitor and second resistor in series across one of the first resistor and photo-sensitive element in series in the first voltage divider circuit for providing actuating voltage for the semiconductors only after a time delay to prevent cycling of the semiconductors due to transient condition level conditions.

13. Structure as set forth in claim 9 and further including a semiconductor driver circuit connected to the output of the first semiconductor for actuating the means connecting and disconnecting the electrical load in accordance with the output of the first semiconductor.

14. A source of alternating electrical energy, an electrical load, a relay having contacts in series with the source of electrical energy and electrical load in a complete circuit and a relay coil for actuating the relay contacts, a switching transistor, a power supply connected across the source of electrical energy having a relatively high voltage output for energizing the relay coil connected in series circuit through the relay coil and across the emitter collector circuit of the switching transistor whereby when the switching transistor is biased to conduction, the relay coil is energized by the power supply, a relatively low voltage output from the power, a first voltage divider connected across the low voltage output of the power supply comprising a first resistor and a photosensitive element in series, a time delay circuit comprising a capacitor and a second resistor in series with each other and in parallel with one of the first resistor and photo-sensitive element for providing an operating voltage in accordance with the light level sensed by the light sensitive element, a second voltage divider connected across the low voltage output of the power supply including a third and fourth resistor in series, a first operational amplifier having a first input connected between the third and fourth resistors of the second voltage divider, and an inverse input connected between the capacitor and second resistor of the time delay circuit and a fifth feedback resistor for providing hysteresis in the first operational amplifier circuit to stabilize its operation connected between the output and first input of the first operational amplifier, a driver circuit including the switching transistor and a sixth and seventh driver resistor connected in series with each other and to the output of the first operational amplifier with the base of the switching transistor being connected between the sixth and seventh resistors, a third voltage divider comprising an eighth and ninth resistor in series connected across the low voltage output of the power supply, a second operational amplifier having a first input connected between the seventh and eighth resistors of the third voltage divider and ah inverse input connected between the capacitor and second resistor in the time delay circuit, a tenth feedback resistor connected between the first input to the operational amplifier and its output with the output of the second operational amplifier also being connected to the first voltage divider between the first resistor and the photo-sensitive element, whereby the load is connected to the power supply by the switching circuit at a lower light level in the evening than the light level at which it is disconnected from the power supply in the morning.

15. Structure as set forth in claim 14 wherein the first resistor of the first voltage divider is connected in parallel with the time delay circuit, and the photosensitive element of the first voltage divider is connected in series with the parallel combination of the first resistor and the time delay circuit across the low voltage output of the power supply and the contacts of the load relay are normally closed.

16. Structure as set forth in claim 14 wherein the photo-sensitive element of the first voltage divider is connected in parallel with the time delay circuit, and the first resistor of the first voltage divider is connected in series with the parallel combination of the photo-sensitive element and time delay circuit across the low voltage output of the power supply, and wherein the contacts of the load relay are normally open.

17. The structure as set forth in claim 14 wherein one or more of the resistors are variable.

18. A primarily electronic method of controlling a lighting load on a source of electrical energy comprising automatically connecting the source of electrical energy to the lighting load at one light level in the evening and automatically disconnecting the source of electrical energy from the lighting load at a lower light level in the morning, including the steps of electronically recognizing the one lighting level in the evening and primarily electronically connecting the load to the power supply utilizing semiconductors, recognizing a lower lighting level and utilizing a further semiconductor to electronically establish a lower lighting level for disconnecting the load from the power supply in the morning than the lighting level at which the load was connected to the power supply the night before.

19. The method as set forth in claim 18 and further including the step of stabilizing the operation of the semiconductors by feeding back a portion of their output through one of their inputs.

20. The method as set forth in claim 18 and further including providing a time delay between the recognizing of a predetermined light level and operation of the semiconductors produced thereby to prevent cycling of the semiconductors as a result of transient light level signals.

* * * * *